United States Patent [19]

Watanabe et al.

[11] Patent Number: 5,640,650
[45] Date of Patent: Jun. 17, 1997

[54] PROCESS CARTRIDGE INCLUDING A SPACED ROLLING MEMBERS SUPPORT FEATURE AND IMAGE FORMING APPARATUS USING THE SAME

[75] Inventors: Kazushi Watanabe, Yokohama; Shinichi Sasaki, Fujisawa; Isao Ikemoto, Kawasaki; Shigeo Miyabe; Shinya Noda, both of Yokohama, all of Japan

[73] Assignee: Canon Kabushiki Kaisha, Tokyo, Japan

[21] Appl. No.: 501,929

[22] Filed: Jul. 13, 1995

Related U.S. Application Data

[62] Division of Ser. No. 174,809, Dec. 29, 1993.

[30] Foreign Application Priority Data

| May 20, 1993 | [JP] | Japan | 5-118518 |
| Jul. 14, 1993 | [JP] | Japan | 5-174118 |
| Nov. 30, 1993 | [JP] | Japan | 5-299914 |

[51] Int. Cl.⁶ .................................................. G03G 15/00
[52] U.S. Cl. .................................................. 399/117
[58] Field of Search .................................... 355/200, 210, 355/211, 213, 245; 384/512, 513, 515, 523, 569

[56] References Cited

U.S. PATENT DOCUMENTS

| 3,985,432 | 10/1976 | Hou et al. | 355/211 |
| 5,053,817 | 10/1991 | Ogiri et al. | 355/211 |
| 5,151,734 | 9/1992 | Tsuda et al. | 355/200 |
| 5,283,616 | 2/1994 | Numagami et al. | 355/245 |

*Primary Examiner*—William J. Royer
*Attorney, Agent, or Firm*—Fitzpatrick, Cella, Harper & Scinto

[57] ABSTRACT

The present invention provides a process cartridge mountable to an image forming apparatus, comprising a rotary member, a holding member for holding the rotary member, and a plurality of rolling members assembled between the rotary member and the holding member independently from the holding member.

31 Claims, 11 Drawing Sheets

5,640,650

PROCESS CARTRIDGE INCLUDING A SPACED ROLLING MEMBERS SUPPORT FEATURE AND IMAGE FORMING APPARATUS USING THE SAME

This application is a division of application Ser. No. 08/174,809, filed Dec. 29, 1993, now allowed.

BACKGROUND OF THE INVENTION

1. Field of the Invention

The present invention relates to a method for assembling rolling members, a rotary member, a process cartridge and an image forming apparatus. The image forming apparatus may be, for example, an electrophotographic copying machine, a facsimile machine, a laser beam printer, an LED printer, a word processor and the like. Further, the rotary member is rotated during the image forming operation and may be, for example, a photosensitive drum as an image bearing member, an insulation drum, a developing sleeve as a developer bearing member, a charge roller as a charge means and the like.

2. Description of the Related Art

In an image forming apparatus such as a printer, a latent image is formed on an image bearing member by selectively exposing the uniformly charged image bearing member. The latent image is visualized as a toner image and the toner image is transferred onto a recording medium, thereby recording the image. In such an image forming apparatus, since the maintenance of various elements can be performed only by expert servicemen, the users experienced inconvenience. To avoid such inconvenience, there has been proposed a process cartridge wherein the image bearing member, charger, developing device, cleaning device and the like are integrally assembled as a unit which can be removably mounted to an image forming apparatus by the user and which can be exchanged by a new one when the toner is used up or the service lives of the image bearing member and the like have expired, thereby facilitating maintenance.

Such a process cartridge is required to be made small-sized in correspondence to the requirement of the compactness of the image forming apparatuses. To this end, sliding bearings have been used as bearings for rotary members such as the image bearing member (for example, a photosensitive drum) and a developer bearing member (for example, a developing sleeve). However, when the process cartridge is mounted to the image forming apparatus and then is driven, a great torque is applied to the rotary members such as the image bearing member and the developer bearing member. Thus, when such rotary members are supported by the sliding bearings, since the sliding resistance of the rotary member being rotated is great, a great load is generated. Accordingly, in order to drive such rotary members, a large motor capable of generating great torque is required, thereby making the image forming apparatus more expensive.

SUMMARY OF THE INVENTION

An object of the present invention is to provide a method for assembling rolling members, a rotary member, a process cartridge and an image forming apparatus, which permit the image forming apparatus to be made more small-sized.

Another object of the present invention is to provide a method for assembling rolling members, a rotary member, a process cartridge and an image forming apparatus, which can reduce the sliding resistance.

A further object of the present invention is to provide a method for assembling rolling members, a rotary member, a process cartridge and an image forming apparatus, which can improve the rotating accuracy, thereby improving the image quality.

A still further object of the present invention is to provide a method for assembling rolling members, a rotary member, a process cartridge and an image forming apparatus, which can reduce the driving torque to make motors small-sized and to reduce the noise.

Yet another object of the present invention is to provide a method for assembling rolling members, a rotary member, a process cartridge and an image forming apparatus, which can reduce the rotating load of the rotary member to rotate the rotary member with smaller torque.

DETAILED DESCRIPTION OF THE PREFERRED EMBODIMENTS

The present invention will now be fully explained in connection with embodiments thereof with reference to the accompanying drawings.

[First Embodiment]

Figure 1:
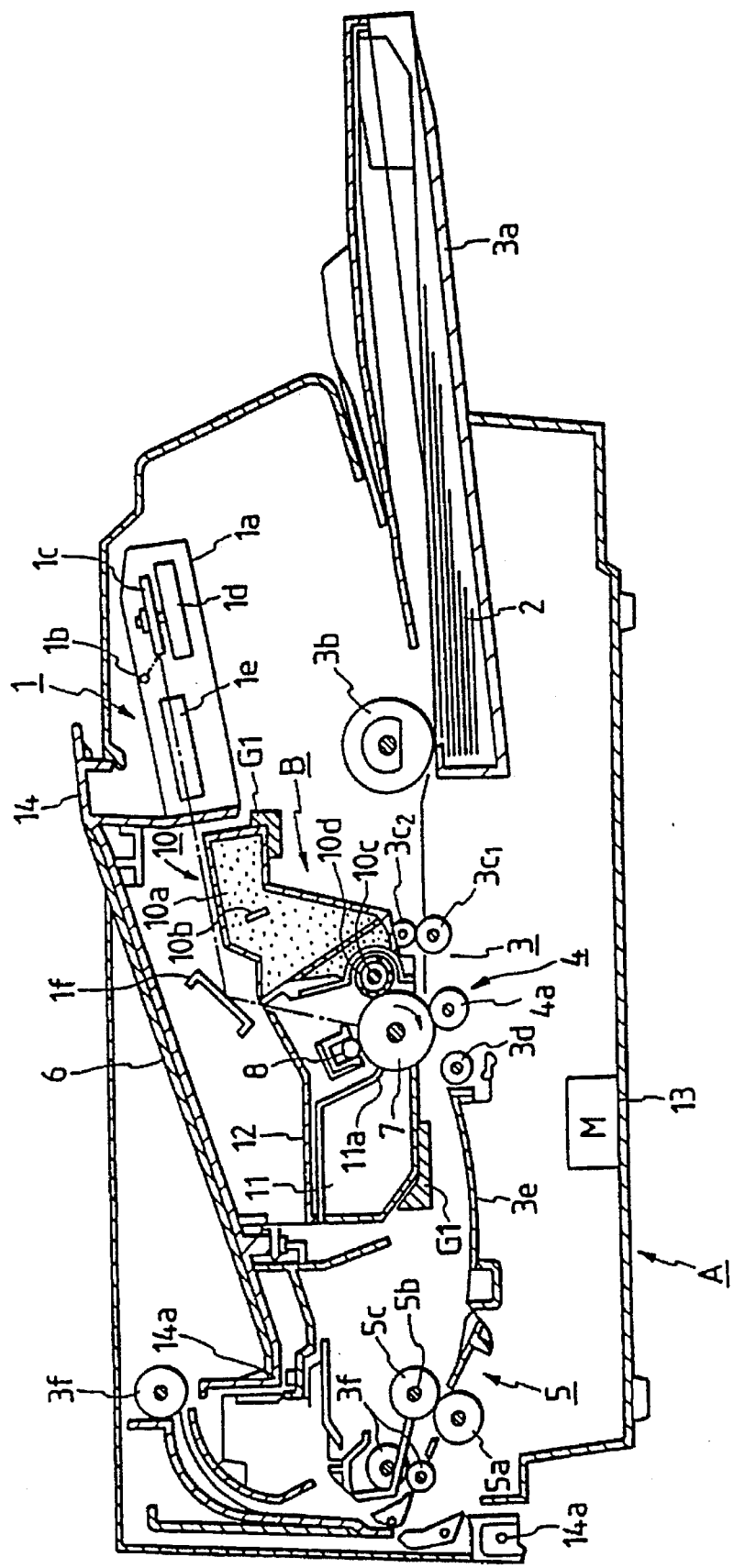
FIG. 1 is an elevational sectional view of an image forming apparatus according to the present invention.
Figure 2A:
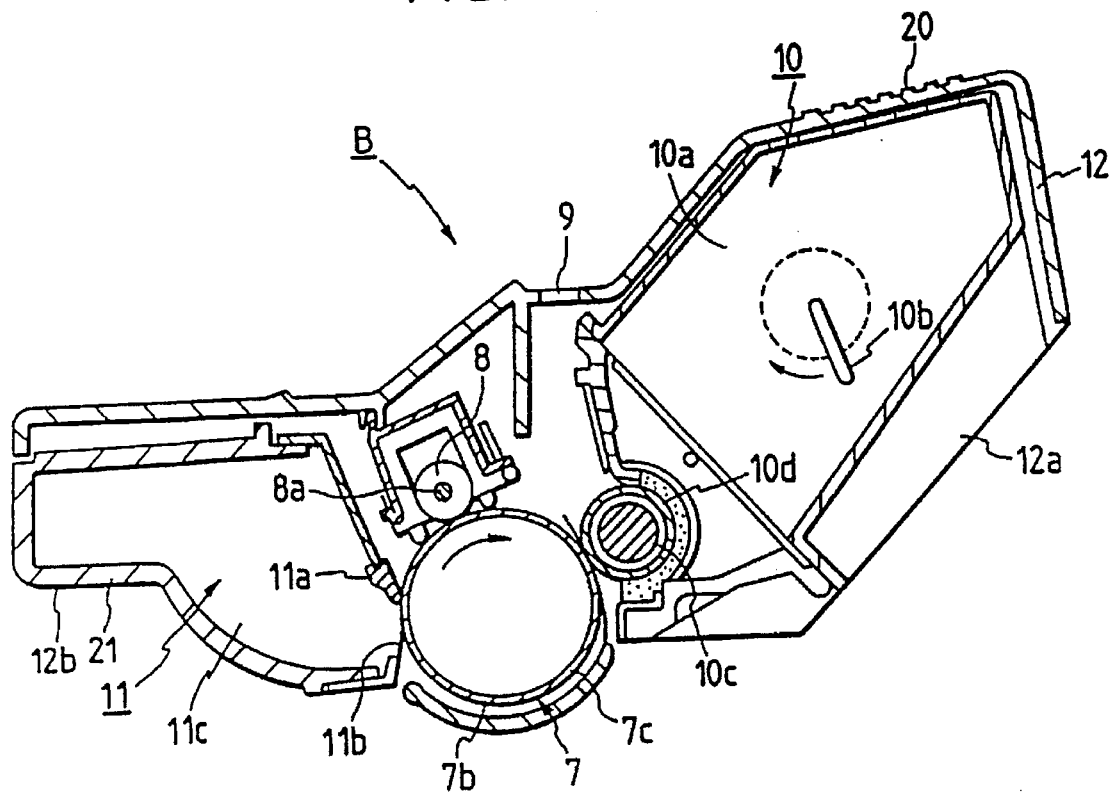
FIG. 2A is a cross-sectional view of a process cartridge according to the present invention.
Figure 2B:
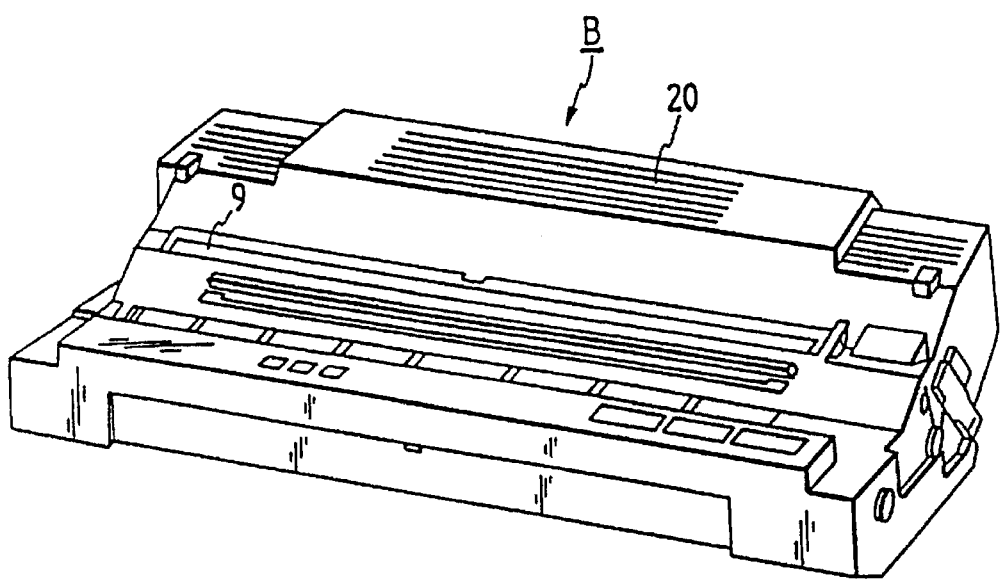
FIG. 2B is a perspective view of the process cartridge.
Figure 3:
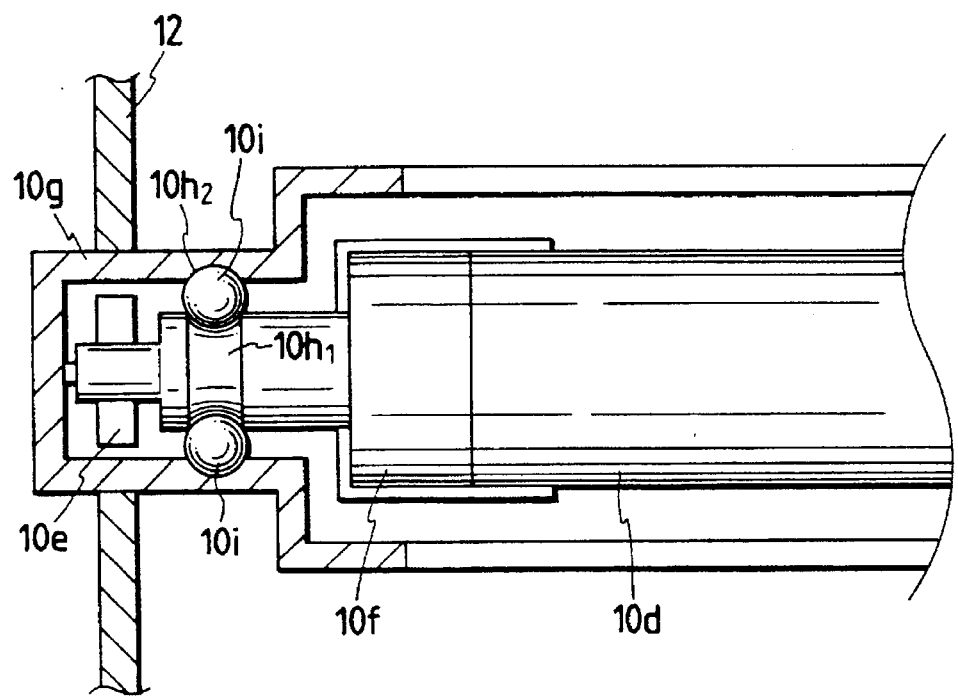
FIG. 3 is a partial sectional view for explaining a bearing portion for a developing sleeve, according to a first embodiment of the present invention.

FIG. 1 is a schematic elevational sectional view of an image forming apparatus to which a process cartridge is mounted, according to a first embodiment of the present invention, FIG. 2A is a cross-sectional view of the process cartridge, FIG. 2B is a perspective view of the process cartridge, and FIG. 3 is a partial sectional view showing a bearing portion for a developing sleeve.

Hereinbelow, first the whole construction of the image forming apparatus to which the process cartridge is mounted will be explained, then, various elements of the image forming apparatus A and the process cartridge B will be explained, and then the bearing portion for a developer carrying member (referred to as "developing sleeve" hereinafter) will be explained.

As shown in FIG. 1, the image forming apparatus A serves to form a developer image (referred to as "toner image" hereinafter) on a photosensitive drum as an example of an image bearing member by illuminating a light image on the drum in response to image information from an optical system 1. A recording medium 2 is conveyed by a convey means 3 in a timed relation to the formation of the toner image, and the toner image formed on the photosensitive drum is transferred onto the recording medium 2 by a transfer means 4 at an image forming portion in the process cartridge B. Thereafter, the recording medium 2 is sent to a fixing means 5, where the transferred toner image is fixed to the recording medium. Then, the recording medium is discharged in a discharge portion 6.

As shown in FIGS. 2A and 2B, in the process cartridge B constituting the image forming portion, a surface of the rotating photosensitive drum 7 is uniformly charged by a charger 8. On the other hand, the light image from the optical system 1 is sent to the photosensitive drum 7 through an exposure portion 9, thereby forming a latent image on the photosensitive drum. The latent image is developed by a developing means 10 to form the toner image. After the toner image is transferred to the recording medium 2 by the transfer means 4, the residual toner remaining on the photosensitive drum 7 is removed by a cleaning means 11. Incidentally, various elements such as the photosensitive drum and the like are incorporated into a housing constituting a cartridge frame to form the cartridge.

Next, the various elements of the image forming apparatus A and the process cartridge B will be explained.

{Image Forming Apparatus}

The optical system, convey means, transfer means, fixing means and cartridge mounting means as the elements of the image forming apparatus A will be described in order.

(Optical System)

The optical system 1 serves to illuminate the light image onto the photosensitive drum 7 by illuminating the light on the drum in response to the image information sent from an external device and the like. As shown in FIG. 1, an optical unit 1a mounted in a body 13 of the image forming apparatus includes a laser diode 1b, a polygon mirror 1c, a scanner motor 1d and a focusing lens 1e. For example, when an image signal is emitted from an external device such as a computer, word processor and the like, the laser diode 1b emits light in response to the image signal to send the image light to the polygon mirror 1c. The polygon mirror 1c is rotated at a high speed by the scanner motor 1d so that the image light reflected from the polygon mirror 1c is incident to the photosensitive drum 7 via the focusing lens 1e and a reflection mirror 1f, thereby selectively exposing the surface of the photosensitive drum 7 to form the latent image thereon in response to the image information.

(Recording Medium Convey Means)

Next, the convey means 3 for conveying the recording medium 2 (for example, a recording sheet, OHP sheet or thin film) will be explained. The body 13 of the image forming apparatus is provided with a mounting portion for a cassette 3a. The recording medium 2 contained in the cassette 3a mounted on the mounting portion are picked up one by one from the uppermost one by a pick-up roller 3b to be sent to a pair of regist rollers 3c1, 3c2. The regist rollers 3c1, 3c2 serve to send the recording medium 2 to the image forming portion in registration with the image formation. The recording medium 2 to which the image was transferred at the image transfer portion is sent to the fixing means 5 by a convey roller 3d and a guide plate 3e. After fixing of the image the recording medium 2 is discharged onto the discharge portion 6 arranged at an upper portion of the apparatus by a pair of discharge rollers 3f.

(Transfer Means)

The transfer means 4 serves to transfer the toner image formed on the photosensitive drum 7 in the image forming portion onto the recording medium 2. In the illustrated embodiment, as shown in FIG. 1, the transfer means 4 comprises a transfer roller 4a. That is to say, the recording medium 2 is urged against the photosensitive drum 7 in the mounted process cartridge B by the transfer roller 4a, and the toner image on the photosensitive drum 7 is transferred onto the recording medium 2 by applying a voltage having the polarity opposite to that of the toner to the transfer roller 4a.

(Fixing Means)

The fixing means 5 serves to fix the toner image transferred to the recording medium 2 by applying the voltage to the transfer roller 4a onto the recording medium 2. As shown in FIG. 1, the fixing means comprises a rotating drive roller 5a, and a driven fixing roller 5c having a heater 5b therein and urged against the drive roller 5a to be rotatingly driven by the rotation of the drive roller. That is to say, while the recording medium 2 to which the toner image was transferred at the transfer portion is being passed between the drive roller 5a and the fixing roller 5c, the toner image is fixed to the recording medium by applying the pressure from the rollers 5a, 5c and the heat from the fixing roller 5c to the recording medium 2.

(Process. Cartridge Mounting Means)

A cartridge mounting means for mounting the process cartridge B is arranged in the image forming apparatus A.

The mounting and dismounting of the process cartridge B with respect to the body 13 of the image forming apparatus is effected by opening an opening/closing cover 14. That is to say, the opening/closing cover 14 is pivotally mounted on the body 13 at its upper portion via hinges 14a. Adjacent to the cover 14, a cartridge mounting space is formed in the apparatus body 13, and a pair of left and right guide members G1 (only one of which is shown) are attached to left and right walls defining the cartridge mounting space. Further, the guide members G1 are provided with guides for inserting the process cartridge B. After the cover 14 is opened and the process cartridge B is inserted into the cartridge mounting space, the process cartridge B is mounted to the image forming apparatus A by closing the cover 14.

(Process Cartridge)

Next, various elements of the process cartridge B to be mounted to the image forming apparatus A will be explained.

The process cartridge includes an image bearing member, and at least one process means. The process means may be, for example, a charge means for charging a surface of the image bearing member, a developing means for forming the toner image on the image bearing member, and/or a cleaning means for removing the residual toner remaining on the image bearing member. As shown in FIGS. 2A and 2B, the process cartridge B according to the illustrated embodiment integrally incorporates therein the charge means 8, exposure portion 9, developing means 10 and cleaning means 11 which are arranged around the photosensitive drum (image bearing member) 7 and which are enclosed by a housing comprised of a frame 12 (comprising a first frame 12a and a second frame 12b) thus forming a cartridge which can be removably mounted to the body 13 of the image forming apparatus.

Now, the photosensitive drum 7, charge means 8, exposure portion 9, developing means 10 and cleaning means 11 as the elements of the process cartridge B will be fully described in order.

(Photosensitive Drum)

The photosensitive drum according to the illustrated embodiment is constituted by a cylindrical drum base 7b made of aluminium, and an organic photosensitive layer 7c coated on an outer peripheral surface of the drum base. The photosensitive drum 7 is rotatably mounted on the frame 12. As will be described later, by transmitting a driving force from a drive motor of the image forming apparatus to a flange gear secured to one longitudinal end of the photosensitive drum 7, the photosensitive drum 7 is rotated in a direction shown by the arrow in FIG. 1 in response to the image forming operation.

(Charge Means)

The charge means serves to uniformly charge the surface of the photosensitive drum 7. In the illustrated embodiment, the charge means is a so-called "contact charge" type wherein a charge roller 8 is rotatably mounted on the frame 12. The charge roller 8 comprises a conductive elastic layer mounted on a metallic roller shaft 8a, a high resistive elastic layer coated on the conductive layer, and a protection layer coated on the high resistive layer. The conductive elastic layer is formed by dispersing carbon in an elastic rubber layer made of EPDM, NBR or the like and serves to guide a bias voltage applied to the roller shaft 8a. The high resistive elastic layer is made of urethane rubber or the like (as an example, including a small amount of pulverized conductive powder) and serves to prevent the abrupt reduction of the bias voltage by restricting the leak current to the photosensitive drum 7 even if the high conductive charge roller is opposed to a pinhole in the photosensitive drum 7. Further, the protection layer is made of N-methyl methoxy nylon and serves to prevent the deterioration of the surface of the photosensitive drum 7 even if the plastic materials of the conductive elastic layer and the high resistive elastic layer contact the photosensitive drum 7.

The charge roller 8 is contacted with the photosensitive drum 7. During the image formation, the charge roller 8 is rotated by the rotation of the photosensitive drum 7, during which the bias voltage obtained by overlapping a DC voltage with an AC voltage is applied to the charge roller 8, thereby uniformly charging the surface of the photosensitive drum 7.

(Exposure Portion)

The exposure portion 9 serves to form an electrostatic latent image on the photosensitive drum 7 by exposing the uniformly charged surface of the photosensitive drum 7 with the light image from the optical system 1. In the illustrated embodiment, the exposure portion is constituted by an opening 9 (for passing the light image) formed in an upper surface of the frame 12.

(Developing Means)

As shown in FIGS. 1 and 2A, the developing means 10 has a toner reservoir 10a for containing the toner, in which a toner feed member 10b rotated in a direction shown by the arrow to feed out the toner is provided. The developing means also has a magnet 10c therein, and further has a developing sleeve 10d for forming a thin toner layer thereon by its own rotation, which developing roller is opposed to the photosensitive drum 7 with a small gap therebetween. When the toner layer is being formed on the surface of the developing sleeve 10d, charges sufficient to develop the electrostatic latent image on the photosensitive drum 7 are obtained by the friction between the toner and the developing sleeve 10d.

(Cleaning Means)

As shown in FIGS. 2A and 2B, the cleaning means 11 comprises a cleaning blade 11a contacted with the surface of the photosensitive drum 7 and adapted to scrape or remove the residual toner remaining on the photosensitive drum 7, a dip sheet 11b disposed below the blade 11a to receive the removed toner and lightly contacted with the surface of the photosensitive drum 7, and a waste toner reservoir 11c for collecting the waste toner from the dip sheet.

Incidentally, the reference numeral 20 denotes a grip; and 21 denotes a guide which is engaged by the guide member G1 of the image forming apparatus when the cartridge is inserted into the image forming. apparatus.

{Bearing Portion for Developing Sleeve}

Next, a bearing portion for the developing sleeve 10d will be explained with reference to FIG. 3. Incidentally, the developing sleeve 10d used in the illustrated embodiment is formed by making a surface of a cylindrical aluminium member rough by a sand blast treatment and the like and by coating a conductive paint dispersing pigment therein on the cylindrical aluminium member. Thus, when the toner layer is being formed on the developing sleeve 10d, changes due to the friction between the toner and the developing sleeve 10d, sufficient to develop the electrostatic latent image on the photosensitive drum 7 are obtained.

Figure 6:
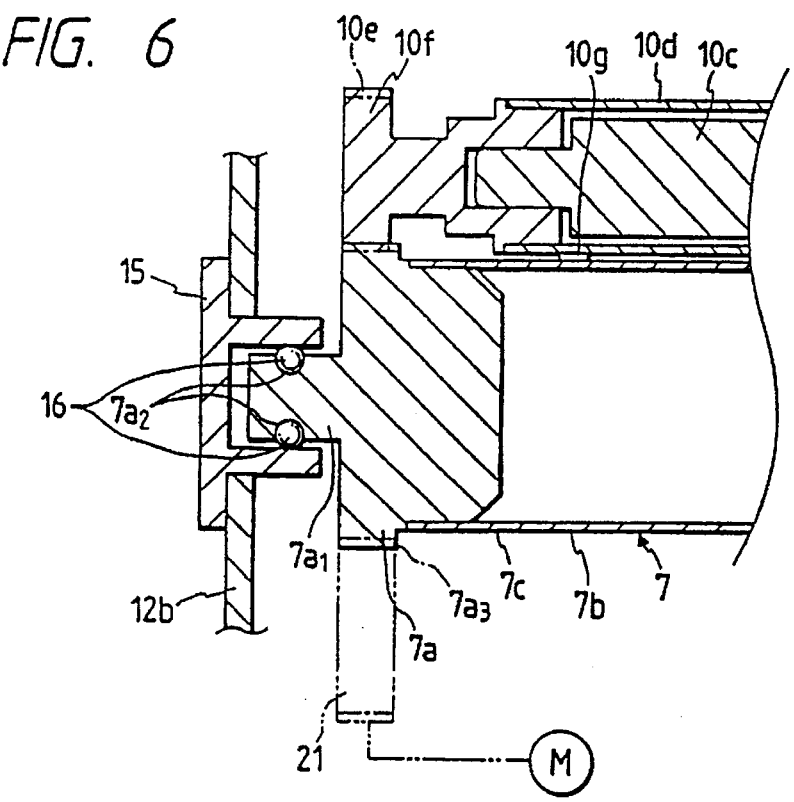
FIG. 6 is a partial sectional view for explaining a bearing portion for a photosensitive drum, according to a fourth embodiment of the present invention.

When the driving force from the drive motor M of the image forming apparatus is transmitted to the flange gear 7a of the photosensitive drum via a gear 21 of the image forming apparatus and then is transmitted from the flange gear 7a to a sleeve gear 10e of the developing sleeve, the photosensitive drum 7 and the developing sleeve 10d are rotated (FIG. 6).

In the illustrated embodiment, the developing sleeve 10d and its end flange 10f are held in a sleeve cap (holding member for the rotary member) 10g via balls 10i (FIG. 3). More particularly, a circumferential groove 10h1 is formed on the peripheral surface of the flange 10f fitted on the end of the developing sleeve 10d, and a plurality of recesses 10h2 opposed to the groove 10h1 are formed in an inner surface of the sleeve cap 10g, and a plurality of small diameter balls (rolling members) 10i are rotatably retained between the groove 10h1 and the recesses 10h2. That is to say, in the illustrated embodiment, the flange 10f acts as an inner race of a bearing and the sleeve cap 10g acts as an outer race of the bearing. Incidentally, the sleeve cap 10g is held by the housing 12.

For example, although each of the balls 10i is made of metal, the ball may be made of anti-wear hard plastics in consideration of the materials of the flange and the sleeve cap. Further, in the illustrated embodiment, while an example that the groove 10h1 is formed in the flange 10f and the recesses 10h2 are formed in the sleeve cap 10g was explained, such recesses 10h2 may be formed in the flange 10f and such groove 10h1 may be formed in the sleeve cap 10g. Incidentally, in the illustrated embodiment, while an example that the flange 10f and the sleeve cap 10g are made of hard plastics was explained, the present invention is not limited to this example, but flange and sleeve cap may be made of metal such as stainless steel.

With the above-mentioned arrangement of the bearing portion, when the developing sleeve 10d is rotated, the balls 10i are freely rolled to reduce the coefficient of friction (due to the sliding bearing), thereby reducing the torque greatly, and thus, making the apparatus more small-sized than the conventional image forming apparatuses using a ball bearing.

Incidentally, the bearing portion is not limited to the above-mentioned arrangement. Now, other bearing portions will be explained as a second embodiment and other embodiments. Incidentally, functional elements same as those of the first embodiment are designated by the same reference numerals.

[Second Embodiment]

Figure 4:
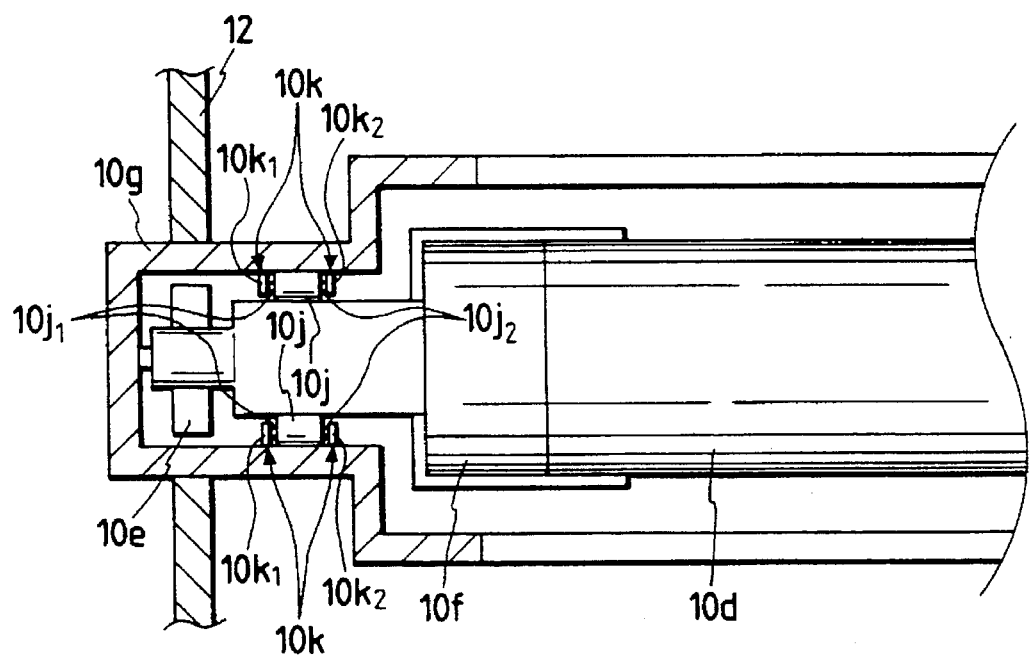
FIG. 4 is a partial sectional view for explaining a bearing portion (using rollers as rolling members) for a developing sleeve, according to a second embodiment of the present invention.

Next, a second embodiment of the present invention will be explained with reference to FIG. 4. FIG. 4 is a partial longitudinal sectional view of a developing means.

In this embodiment, in place of the balls (spherical members), cylindrical rollers 10j are used. The rollers 10j are rotatably held in a plurality of roller holding portions 10k formed on the inner surface of the sleeve cap 10g. Each roller holding portion 10k comprises a pair of opposed vertical plates 10k1, 10k2 between which both end shafts 10j1, 10j2 of each roller 10j are rotatably supported. With this arrangement, the rollers 10j can easily be held by the sleeve cap 10g, and the same technical effect as that of the first embodiment regarding the reduction of torque can be achieved. Incidentally, also in this second embodiment, the rotary member is not limited to the developing sleeve 10d, but the present invention may be applied to the assembling of a photosensitive drum, charge roller and the like. Furthermore, the roller holding portions 10k may be formed on the flange 10f.

[Third Embodiment]

Figure 5:
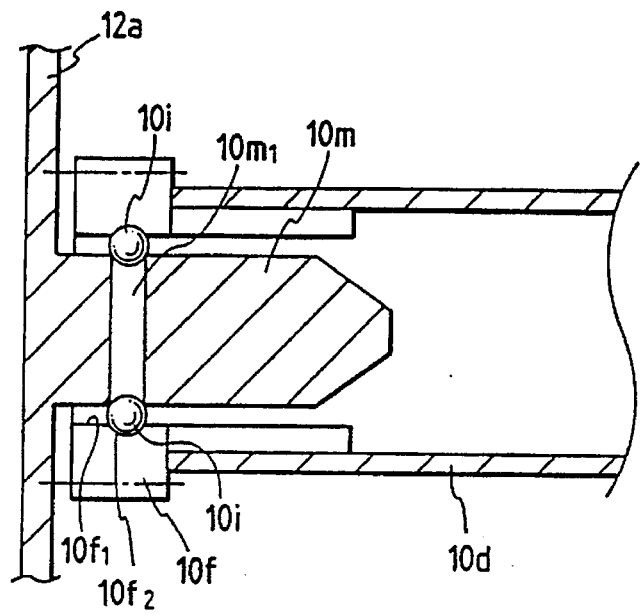
FIG. 5 is a partial sectional view for explaining a bearing portion (using a dowel as a holding member for holding a rotary member) for a developing sleeve, according to a third embodiment of the present invention.

Next, a third embodiment of the present invention will be explained with reference to FIG. 5. In the first and second embodiments, an example that the peripheral surface of the rotary member such as the developing sleeve 10d and/or the photosensitive drum 7 is rotatably held in the frame 12 was explained. To the contrary, in this third embodiment, an inner surface of the rotary member is rotatably held.

A groove 10f2 is formed in an inner diameter portion 10f1 of the flange 10f fitted in the end of the developing sleeve 10d, and recesses 10m1 opposed to the groove 10f2 are formed in an surface of a dowel (shaft) 10m protruded inwardly from a side plate 12a (a portion of the cartridge frame 12), and the balls 10i are rotatably held between the groove 10f2 and the recesses 10m1. Such balls 10i may be replaced by rollers shown in the second embodiment, and each ball may be made of metal or smooth hard plastics. Also with this arrangement, the same technical effect for reducing the torque as those of the first and second embodiments can be achieved.

[Fourth Embodiment]

Next, a fourth embodiment of the present invention will be explained with reference to FIGS. 6, 7A and 7B. This embodiment relates to a bearing portion for the photosensitive drum 7. The drum flange gear 7a is secured to one longitudinal end of the photosensitive drum 7, and a shaft portion 7a1 of the flange gear 7a is rotatably held by a holder (holding member) 15 secured to the frame 12b of the process cartridge B by screws (not shown) via a plurality of balls (rolling members) 16.

Figure 7B:
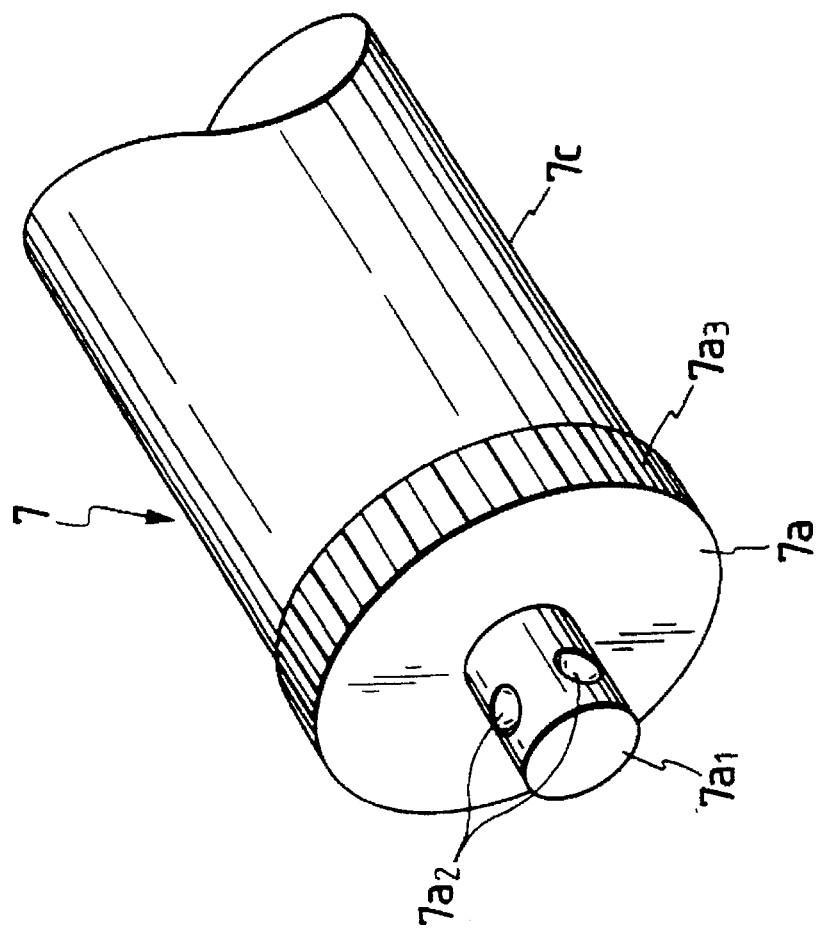
FIG. 7B is a perspective view showing a shaft portion of the photosensitive drum.
Figure 7A:
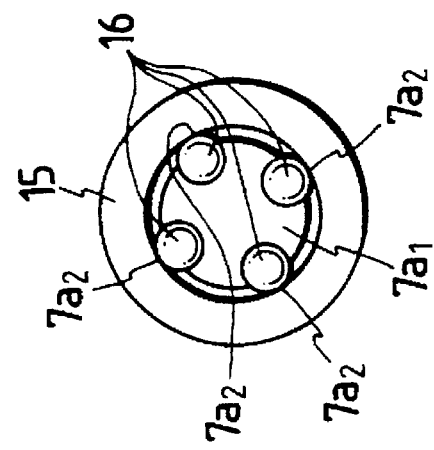
FIG. 7A is a side view showing a bearing portion for a photosensitive drum.

A plurality of recesses 7a2 for regulating the positions of the balls 16 are formed in a peripheral surface of the shaft portion 7a1 of the flange gear 7a along a rotational direction of the photosensitive drum 7 (see FIGS. 7A and 7B). Further, in a method for assembling the bearing portion, the photosensitive drum 7 is firstly cocked so that the flange gear 7a is positioned at the top, the balls 16 are received in the recesses 7a2, the photosensitive drum and the balls are assembled to the frame 12b as they are, and then the holder 15 is assembled thereon.

In this way, by providing the balls 16 between the photosensitive drum 7 and the holder 15 for rotatably holding the photosensitive drum, it is possible to reduce the drive torque by about 20–50% in comparison with the conventional bearings. Further, since the shaft portion 7a1 and the holder 15 also act as the inner race and the outer race of the rolling bearing, respectively, and the position of the photosensitive drum 7 in the axial direction and in the rotational direction is regulated by the recesses 7a2 formed in the shaft portion 7a2, it is possible to provide an image forming apparatus which is cheaper and more small-sized than the conventional image forming apparatuses.

Incidentally, in this embodiment, the driving force of the drive motor M of the image forming apparatus is transmitted to the flange gear 7a via the gear 21. Further, the flange gear 10f of the developing sleeve 10d is rotated via the flange gear 7a. Further, spacer rollers 10g (FIG. 6) serve to maintain the gap between the developing sleeve 10d and the photosensitive drum 7. Furthermore, the photosensitive drum 7 comprises a sleeve 7b on which a photosensitive layer 7c is coated. In addition, gear portions 7a3, 10f1 may be spur gears or helical gears; however, when the helical gears are used, the driving force is transmitted more smoothly than when the spur gears are used.

[Fifth Embodiment]

Figure 8:
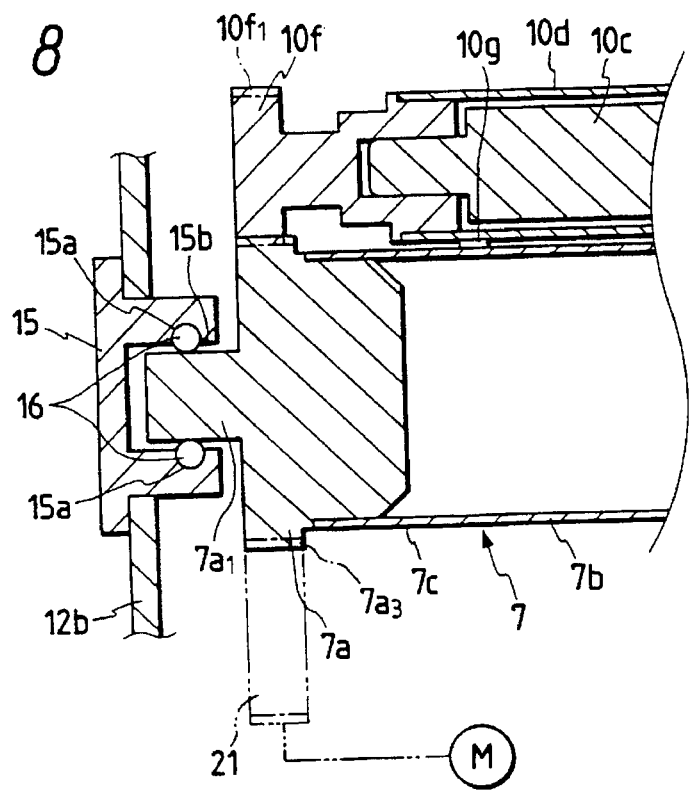
FIG. 8 is a partial sectional view showing a fifth embodiment of the present invention wherein the positions of rolling members are regulated by a holder as a holding member.
Figure 9A:
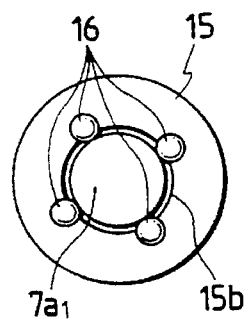
FIG. 9A is a side view showing the fifth embodiment.
Figure 9B:
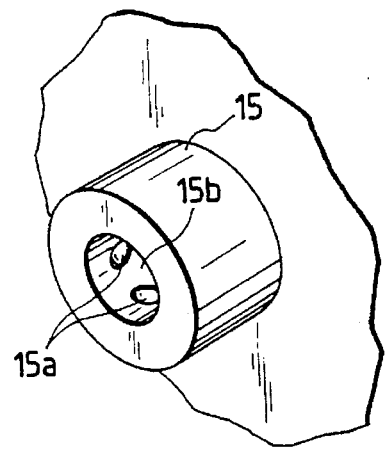
FIG. 9B is a perspective view showing the fifth embodiment.

In the above-mentioned fourth embodiment, while an example that the positions of the balls 16 are regulated by providing the recesses 7a2 in the shaft portion 7a1 of the photosensitive drum 7 was explained, as shown in FIGS. 8, 9A and 9B, the positions of the balls 16 may be regulated by the holder (holding member) 15. In the embodiment shown in FIGS. 8, 9A and 9B, a plurality of recesses 15a (the number of which corresponds to the number of balls 16 to be used) are formed in an inner peripheral surface 15b of the holder 15 along the rotational direction of the photosensitive drum 7. The balls 16 are received in these recesses 15a, and the holder 15 is assembled to the shaft portion 7a1 of the photosensitive drum 7 attached to the frame 12b.

Also with this arrangement, the same technical effect as that of the fourth embodiment can be achieved.

[Sixth Embodiment]

Figure 10:
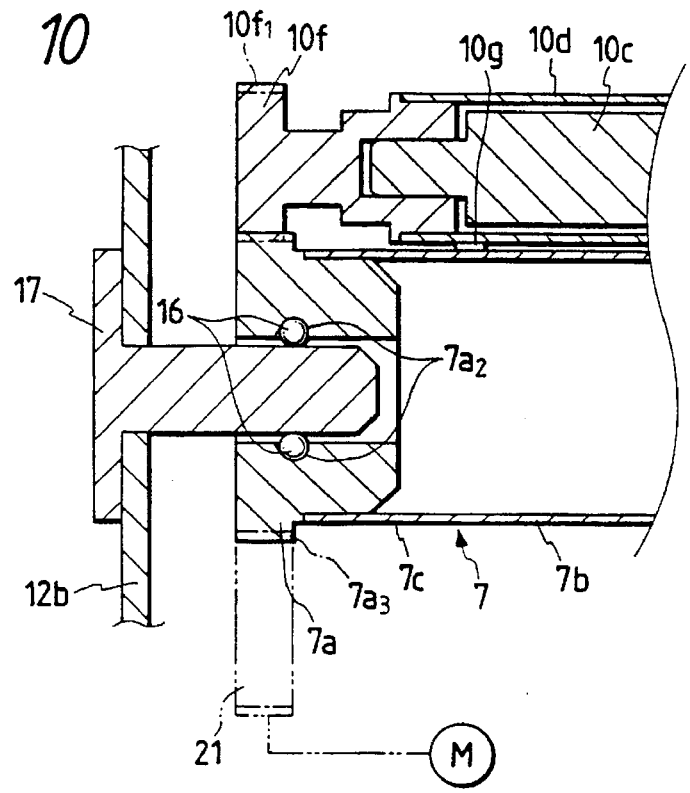
FIG. 10 is a partial sectional view showing a sixth embodiment of the present invention wherein a photosensitive drum is held by a positioning shaft and recesses are formed in a flange gear.

As shown in FIG. 10, in place of the holder for holding the rotary member, similar to the third embodiment, the photosensitive drum 7 may be held by inserting a positioning shaft 17 secured to the frame 12b into the flange gear 7a secured to one end of the photosensitive drum (rotary member) 7. In this case, the balls 16 are received in a plurality of recesses 7a2 formed in an inner surface of the flange gear 7a along the rotational direction of the photo-sensitive drum 7, the photosensitive drum 7 is attached to the frame, and then the positioning shaft 17 is inserted into a bore (defined by the inner surface) of the flange gear 7a, thereby assembling the photo-sensitive drum.

Also with this arrangement, it is possible to reduce the rotational torque of the photo-sensitive drum 7 by the rolling movements of the balls 16. Further, the positions of the balls 16 are regulated by the recesses 7a2 of the flange gear 7a in the rotational direction and the axial direction of the photosensitive drum 7.

[Seventh Embodiment]

Figure 11:
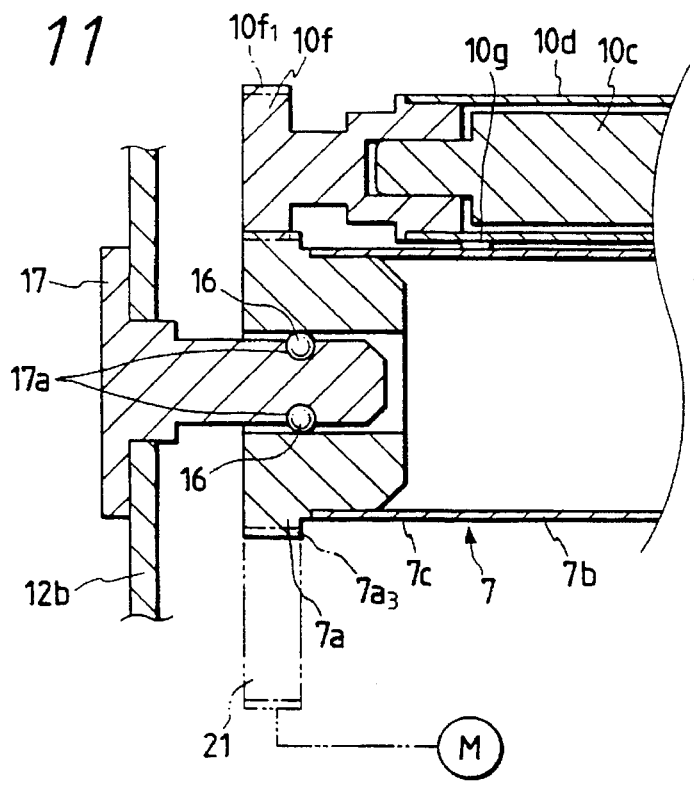
FIG. 11 is a partial sectional view showing a seventh embodiment of the present invention wherein a photosensitive drum is held by a positioning shaft and recesses are formed in the positioning shaft.

An embodiment shown in FIG. 11 is similar to that of the sixth embodiment. However, in this embodiment, the positions of the balls 16 are regulated by the positioning shaft 17. More particularly, in this seventh embodiment, ball receiving recesses 17a are formed in an outer peripheral surface of the positioning shaft 17 secured to the frame 12b, thereby regulating the positions of the balls 16. Also with this arrangement, the same technical effect as that of the sixth embodiment can be achieved.

[Eighth Embodiment]

Figure 12:
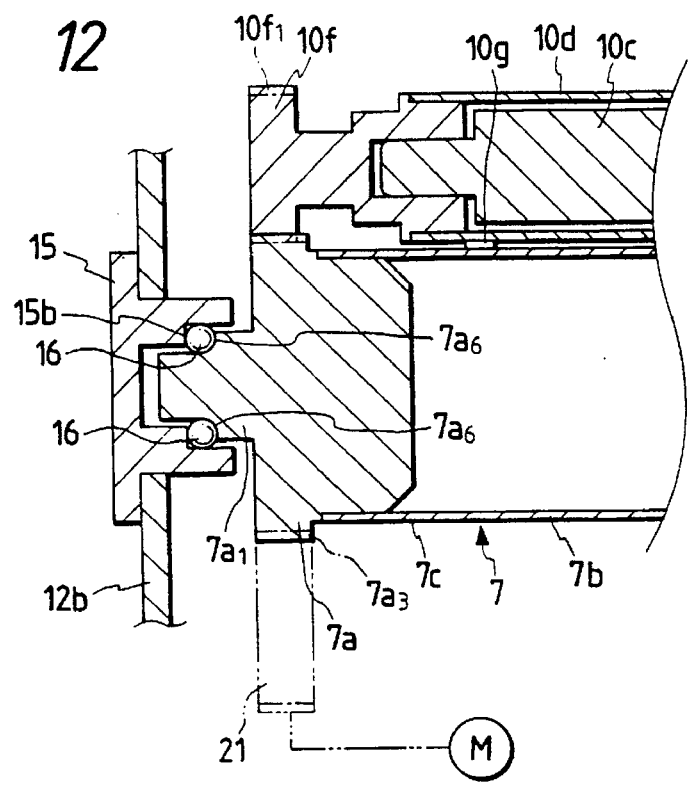
FIG. 12 is a partial sectional view showing an eighth embodiment of the present invention wherein recesses are formed in a shaft of a photosensitive drum and the positions of balls are regulated by a step or shoulder formed between the drum shaft and a holder.
Figure 13A:
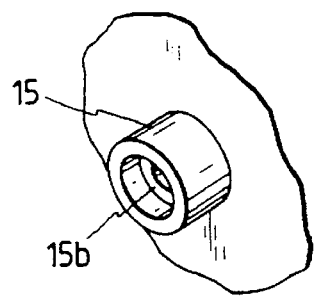
FIGS. 13A and 13B are perspective views showing the eighth embodiment.
Figure 13B:
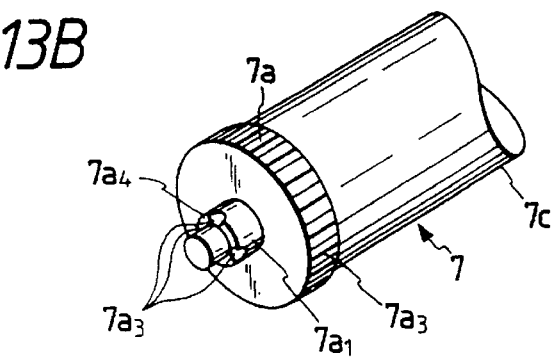

In the above-mentioned fourth to seventh embodiments, while examples that the positions of the balls 16 in the axial and rotational directions of the rotary member are regulated by mounting the balls in the recesses formed in the rotary member or in the holding member were explained, an arrangement as shown in FIGS. 12, 13A and 13B may be adopted. That is to say, the shaft portion 7a1 of the flange gear 7a has a large diameter portion and a small diameter portion, and a plurality of recesses 7a6 are formed in a shoulder portion 7a4 between the large and small diameter portions along the rotational direction of the photosensitive drum 7 (FIGS. 13A and 13B). On the other hand, a shoulder 15b is formed on the holder 15 for holding the shaft portion 7a1. In the assembling operation, the photosensitive drum 7 is cocked so that the flange gear 7a is positioned at the top, the balls 16 are received in the corresponding recesses 7a6, the photosensitive drum and the balls are assembled to the frame 12b, and then the holder 15 is attached to the shaft portion 7a1.

With this arrangement, the positions of the balls 16 in the axial direction of the photosensitive drum 7 are regulated by the recesses 7a6, and the positions of the balls in the rotational direction of the drum are regulated by the recesses 7a6 and the shoulder 15b. Also in this case, the rotational torque of the photosensitive drum 7 can be reduced by the presence of the balls 16.

[Ninth Embodiment]

Figure 14:
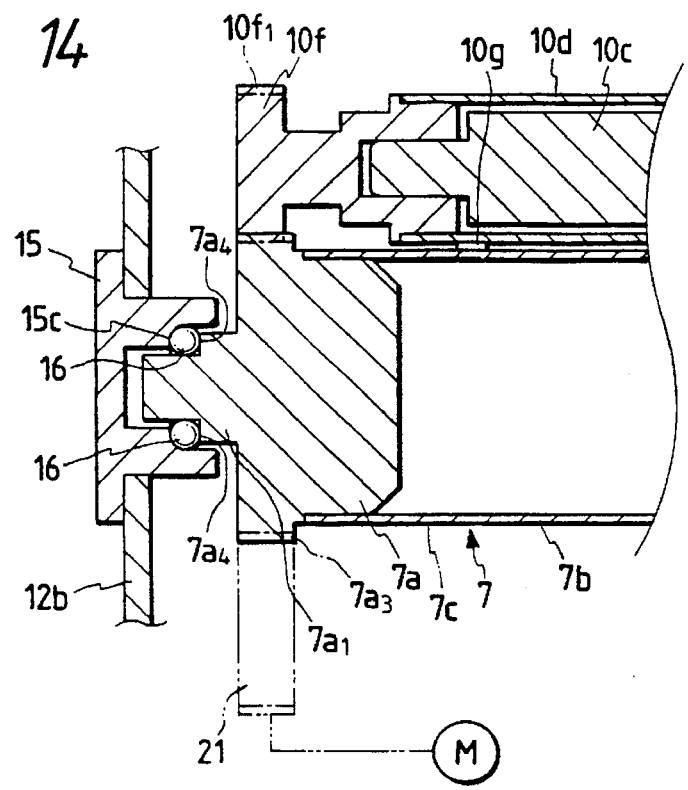
FIG. 14 is a partial sectional view showing a ninth embodiment of the present invention wherein recesses are formed in a holder for a photosensitive drum and the positions of balls are regulated by a step or shoulder formed between a drum shaft and the holder.

An embodiment shown in FIG. 14 is similar to that of the eighth embodiment. However, in this embodiment, the recesses are formed in the holder 15. That is to say, in this ninth embodiment, the inner surface of the holder 15 has a large diameter portion and a small diameter portion, and a plurality of recesses 15c are formed in a shoulder portion between the large and small diameter portions. On the other hand, a shoulder 7a4 is formed on the shaft portion 7a1 of the flange gear 7a attached to the photosensitive drum 7. In the assembling operation, the balls 16 are received in the recesses 15c, and the holder 15 is attached to the frame 12b, and the holder and the frame are assembled to the shaft portion 7a1 of the photosensitive drum 7 from the bottom. With this arrangement, the same technical effect as that of the eighth embodiment can be achieved.

[Tenth Embodiment]

Figure 15:
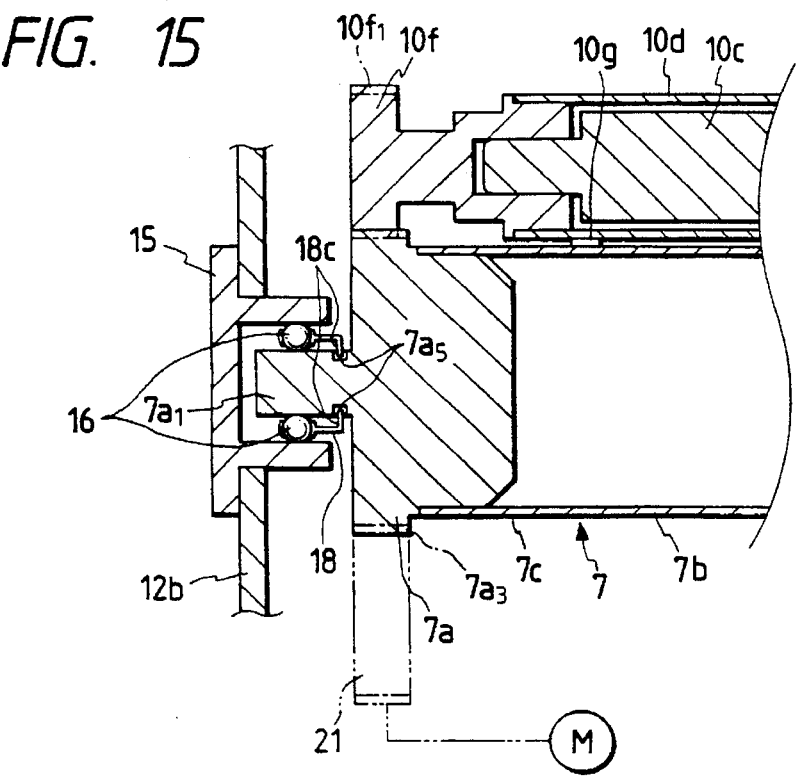
FIG. 15 is a partial sectional view showing a tenth embodiment of the present invention wherein the positions of rolling members are regulated by using a retainer.
Figure 16:
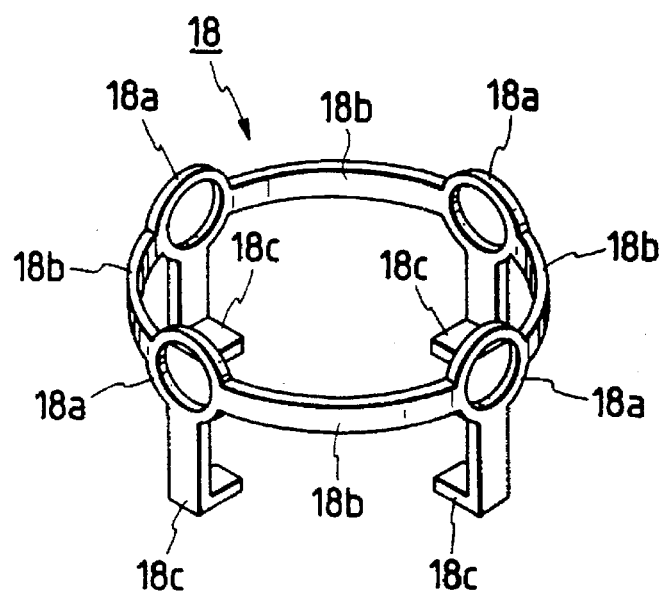
FIG. 16 is a perspective view of the retainer.

In the above-mentioned embodiments, examples that the positions of the balls 16 in the rotational direction of the rotary member are regulated by mounting the balls 16 in the recesses were explained. To the contrary, as shown in FIGS. 15 and 16, the positions of the balls 16 may be regulated by a retainer as a regulating member. More particularly, as shown in FIG. 16, a retainer 18 comprises a plurality of ball receiving portions 18a, connection portions 18b connecting the adjacent ball receiving portions 18a, and hook portions 18c protruded from the respective ball receiving portions 18a. As shown in FIG. 15, the balls 16 are received in the ball receiving portions 18a of the retainer 18, and then the retainer 18 is rotatably attached to the shaft portion 7a1 of the flange gear 7a by elastically deforming the hook portions 18c and fitting the hook portions into a ring groove (locking portion) 7a5 formed in the shaft portion 7a1. Thereafter, the holder 15 is assembled to the shaft portion 7a1. In this way, the positions of the balls 16 in the rotational direction of the photosensitive drum 7 are regulated by the retainer 18. Further, a distance between the adjacent balls 16 is kept constant by the retainer 18.

By using the retainer 18 in this way, only by providing the locking portion 7a5 in the shaft portion 7a1, it is possible to mount the balls (rolling members) 16 to the shaft portion and to reduce the rotational torque of the photosensitive drum 7.

[Eleventh Embodiment]

Figure 17:
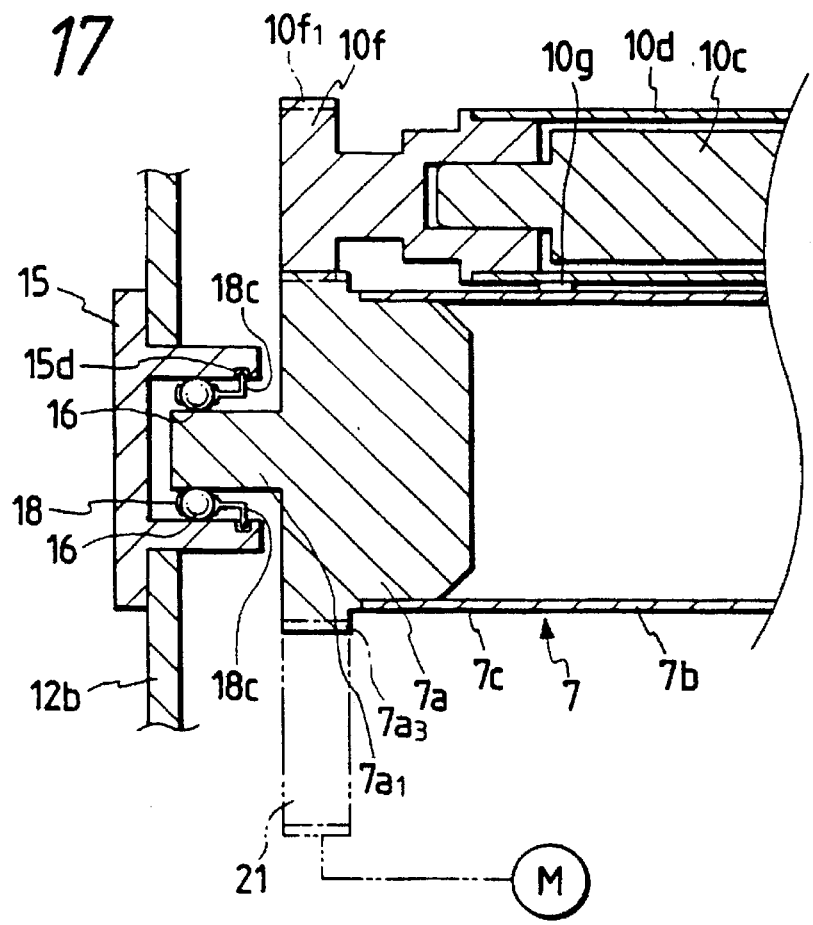
FIG. 17 is a partial sectional view showing an eleventh embodiment of the present invention wherein a retainer is locked to a holder.

An eleventh embodiment shown in FIG. 17 is similar to the tenth embodiment. However, in the eleventh embodiment, the retainer 18 is locked to the holder 15. In this case, the hook portions 18c are directed outwardly. The balls 16 are received in the retainer 18, the hook portions 18c are fitted in a ring groove (locking portion) 15d formed in the inner surface of the holder 15, and then the retainer and the holder are assembled to the shaft portion 7a1 of the flange gear 7a.

By locking the retainer 18 to the holder 15 too, the same technical effect as that of the tenth embodiment can be achieved.

[Twelfth Embodiment]

Figure 18:
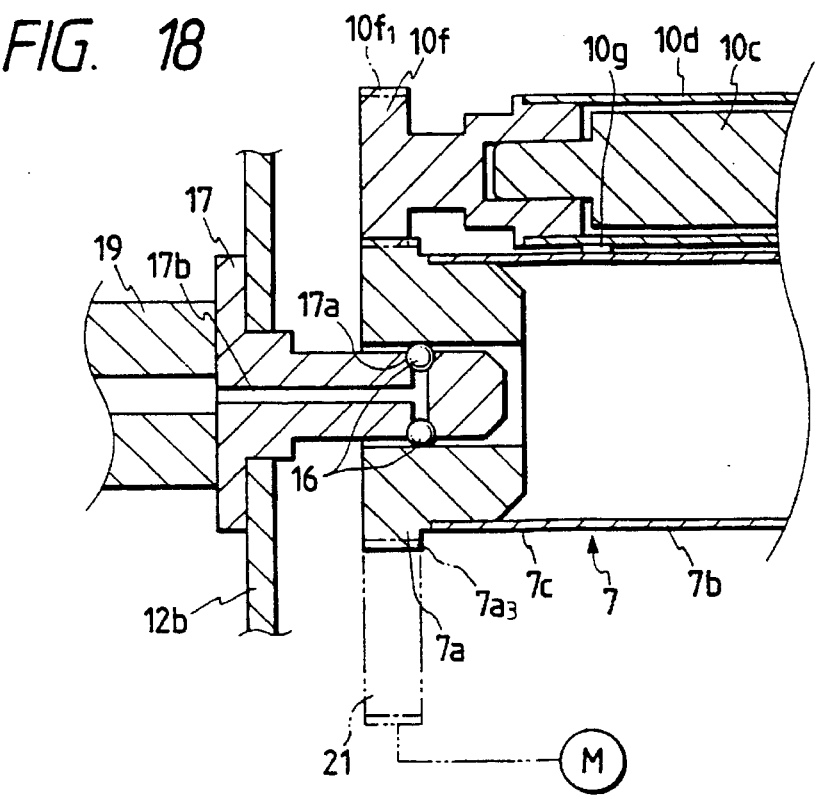
FIG. 18 is a partial sectional view showing a twelfth embodiment of the present invention wherein rolling members are assembled by sucking them through suction holes.

In a twelfth embodiment shown in FIG. 18, a suction bore 17b is formed in the positioning shaft 17 shown in the seventh embodiment (refer to FIG. 11) and the suction bore 17b is communicated with the recesses 17a. In order to assemble the balls 16 to the positioning shaft, a suction tool 19 is connected to the other end of the suction bore 17b remote from the recesses 17a to generate a suction force in the suction bore. Thus, when the balls 16 are received in the recesses 17a, the balls 16 are absorbed in the corresponding recesses. Accordingly, even when the photosensitive drum 7 is fitted on the positioning shaft while the drum is being laid, since the balls 16 do not drop out from the recesses 17a, the assembling operation can easily be performed. Incidentally, although not shown, in the case where the ball receiving recesses are formed in the holder as shown in the fifth embodiment (refer to FIG. 8) and the sixth embodiment (refer to FIG. 10), such suction bore may be formed in the holder so that the assembling operation can easily be performed by sucking the balls 16 received in the recesses of the holder 15 by means of a suction tool connected to the suction bore.

[Thirteenth Embodiment]

Figure 19:
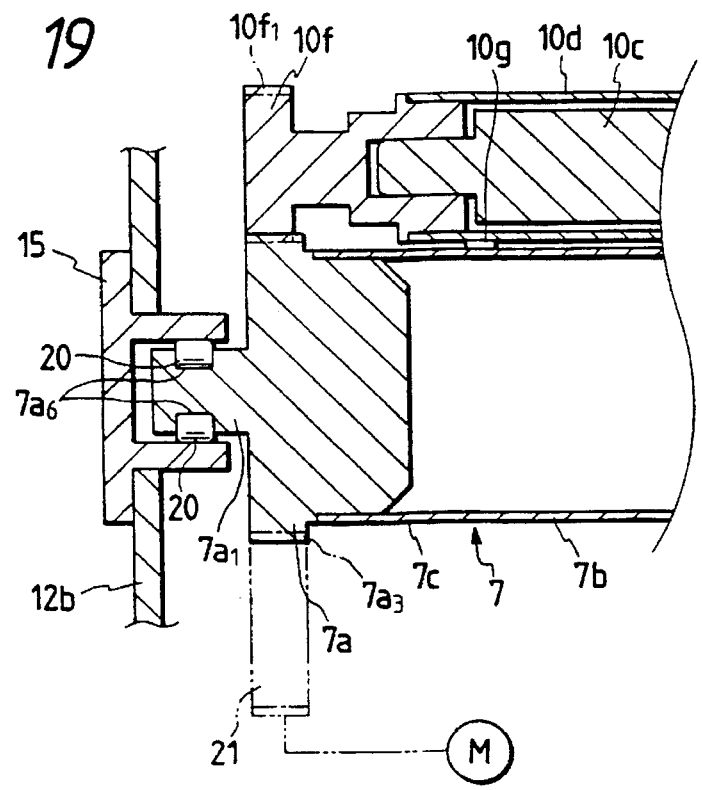
FIG. 19 is a partial sectional view showing a thirteenth embodiment of the present invention wherein rollers are used as rolling members.

In the above-mentioned embodiments, examples that the balls 16 are received in the recesses were explained. However, in the thirteenth embodiment, as shown in FIG. 19, in place of the balls 16, cylindrical rollers 20 are used. In this case, recesses 7a6 which can receive the rollers 20 are formed in the outer peripheral surface of the shaft portion 7a1 or in the inner surface of the holder 15. The positions of the rollers 20 are regulated by the recesses 7a6, and the rotational torque of the rotary member is reduced by interposing the rollers 20 between the rotary member and the holding member.

[Other Embodiments]

In the above-mentioned embodiments, while examples that the balls or the rollers (rolling members) are contacted with the photosensitive drum 7 or the developing sleeve 10d (rotary member) were explained, the present invention is not limited to such examples. For example, the balls or the rollers may be made of metal, conductive plastics or conductive elastomer, the holder (holding member) 15 may be the same conductive material, and the holder may be contacted with an electrode. With this arrangement, it is possible to easily earth the photosensitive drum 7 and to easily apply the voltage to the developing sleeve 10d.

Alternatively, the balls or the rollers (rolling members) may be made of plastics, nylon, polyacetal or elastomer such as hard rubber. In this case, i is possible to absorb the shock on the rotary member in the rotational radius direction of the rotary member during the rotation of the rotary member, and it is possible to prevent the occurrence of any gap due to the dimensional dispersion between the rotary member and the holding member, by making the radii of the rolling members slightly larger and by press-fitting the rolling members onto the rotary member.

Further, in the above-mentioned embodiments, although examples wherein the balls or the rollers are positioned only at a side where the flange gear is positioned were explained, this is the reason why the holding member disposed at the driving side of the rotary member is subjected to great force because the driving force is transmitted via the flange gear. However, the rolling members may be positioned both at the driving side and at the driven side. In this case, the rotational torque can be further reduced. Further, even when the rolling members are positioned only at the driven side, the rotational torque of the rotary member can be reduced to some extent.

Further, in the above-mentioned embodiments, while examples that the photosensitive drum 7 or the developing sleeve 10d is used as the rotary member were explained, the present invention is not limited to such examples, but may be applied to other rotary members in the process cartridge such as the charge roller. Furthermore, the present invention can be applied to a plurality of rotary members such as the photosensitive drum and the developing sleeve.

In addition, in the above-mentioned embodiments, while the holder 15 was used as the holding member for holding the rotary member, the rotary member may be directly held by the cartridge frame itself. Furthermore, the process cartridge B according to the present invention can be applied to any cartridge which can form not only a mono-color image but also a multi-color image (for example, two-color image, three-color image or full-color image).

Further, the image bearing member is not limited to the photosensitive drum, but may comprise the following. First of all, the photosensitive layer may be formed from photoconductive material such as amorphous silicone, amorphous acetone, zinc oxide, titanium oxide or an organic photoconductive body. Further, the photosensitive layer may be coated on a drum-shaped rotary member, a belt-shaped rotary member or a sheet-shaped rotary member. Incidentally, in general, the drum-shaped or belt-shaped member is used, and, in case of the drum-shaped rotary member, the photosensitive layer is obtained by coating or depositing the photo-conductive material on a cylinder made of aluminum alloy and the like.

Further, the developing method may be, for example, the conventional two-component magnetic brush eveloping method, cascade developing method, touchdown developing method, cloud developing method or an other developing method.

In the above-mentioned first embodiment, while the charge means of the so-called contact charge type was used, it should be noted that the charge means may be, as conventionally used, designed so that the surface of the photosensitive drum is uniformly charged by providing three walls made of tungsten wires enclosed by metallic (for example, aluminium) shields and by applying high voltage to the tungsten wires to shift the positive or negative ions (generated by the application of the high voltage) to the surface of the photosensitive drum. Incidentally, the charge means may be of blade (charge blade) type, pad type, block type, rod type or wire type, as well as the roller type.

Further, the cleaning means for removing the residual toner remaining on the photosensitive drum may be constituted by a blade, a fur brush or a magnetic brush.

Furthermore, the process cartridge includes an image bearing member (for example, electrophotographic photosensitive body), and at least one process means. Accordingly, other than the aforementioned example, the process cartridge may integrally incorporate therein an image bearing member and a charge means as a unit which can be removably mounted to an image forming apparatus, or may integrally incorporate therein an image bearing member and a developing means as a unit which can be removably mounted to an image forming apparatus, or may integrally incorporate therein an image bearing member and a cleaning means as a unit which can be removably mounted to an image forming apparatus, or may integrally incorporate therein an image bearing member and two or more process means as a unit which can be removably mounted to an image forming apparatus.

That is to say, the process cartridge integrally incorporates therein an electrophotographic photosensitive body, and the charge means, developing means or cleaning means as a unit which can be removably mounted to an image forming apparatus, or integrally incorporates therein an electrophotographic photosensitive body, and at least one of the charge means, developing means and cleaning means as a unit which can be removably mounted to an image forming apparatus, or integrally incorporates therein an electrophotographic photosensitive body, and at least the developing means as a unit which can be removably mounted to an image forming apparatus.

Further, in the above-mentioned embodiments, while an example that the photosensitive drum 7 and the developing sleeve 10d are incorporated as the process cartridge and the process cartridge is mounted to the image forming apparatus to form the image was explained, the present invention is not limited to this example, but may be applied to an image forming apparatus wherein a photosensitive drum and a developing sleeve are directly mounted on a body of the image forming apparatus. In addition, in the above-mentioned embodiments, while the laser beam printer was illustrated as the image forming apparatus, the present invention is not limited to the laser beam printer, but may be applied to other image forming apparatus such as an electrophotographic copying machine, a facsimile machine, a word processor and the like.

According to the present invention, since rolling resistance is obtained between the rotary member and the holding member by the presence of the rolling members, it is possible to reduce the torque of the process cartridge and to reduce the load fluctuation. Accordingly, the rotary member can be rotated with smaller rotational torque, and the drive source such as the motors and the drive transmission system such as the gears can be made small-sized and inexpensive. Further, due to the reduction of the load fluctuation, it is possible to reduce the uneven rotation of the rotary member and the uneven density of the image.

Further, since the positions of the rolling members are regulated by the rotary member or the holding member, the bearing portion can be made small-sized and cheaper. In addition, when the rolling members are made of plastics or elastomer, it is possible to absorb shock and/or vibration during the rotation of the rotary member, thereby reducing the uneven density of the image caused by shock and vibration.

As mentioned above, according to the present invention, it is possible to reduce the rotational load of the rotary member and to rotate the rotary member with smaller torque.

What is claimed is:

1. A process cartridge having an electrophotographic photosensitive member and process means for acting on the electrophotographic photosensitive member, and being removably mountable onto a main body of an image forming apparatus, said process cartridge comprising:

a cartridge frame;

a rotary member; and support means for rotatably supporting said rotary member on said cartridge frame, said support means including a plurality of rolling members, and a retainer for arranging said rolling members rotatably by regulating an interval between adjacent rolling members along a rotational direction of said rotary member.

2. A process cartridge according of claim 1, wherein said rotary member is a drum-shaped electrophotographic photosensitive member.

3. A process cartridge according to claim 1, wherein said rotary member is a developing roller as said process means for conveying toner to said electrophotographic photosensitive member to develop a latent image formed thereon.

4. A process cartridge according to claims 1, 2, or 3, wherein said rolling members are balls.

5. A process cartridge according to claims 1, 2, or 3, wherein said rolling members are cylindrical rollers.

6. A process cartridge according to claim 1, wherein said retainer comprises a plurality of receiving portions for receiving said rolling members, connecting portions for connecting said receiving portions, and an attaching portion for attaching said retainer.

7. A process cartridge according to claim 1, wherein said support means comprises a flange attached to an end of said rotary member.

8. A process cartridge according to claim 7, wherein said support means comprises a shaft portion and a holder, said shaft portion being attached to said cartridge frame by means of said rolling members whose positions are regulated by said retainer and said holder.

9. A process cartridge according to claim 1, wherein said rolling members are made of a metal.

10. A process cartridge according to claim 9, wherein the metal is conductive.

11. A process cartridge according to claim 1, wherein said rolling members are made of an elastomer.

12. A process cartridge according to claim 11, wherein the elastomer is conductive.

13. An image forming apparatus, onto which a process cartridge is removably mountable onto a main body of said image forming apparatus, for forming an image on a recording medium, said image forming apparatus comprising:

mount means for removably mounting a process cartridge, the process cartridge including an electrophotographic photosensitive member and process means for acting on the electrophotographic photosensitive member, a cartridge frame, a rotary member, and support means for rotatably supporting the rotary member on the cartridge frame, the support means having a plurality of rolling members, and a retainer for arranging the rolling members rotatably by regulating an interval between adjacent rolling members along a rotational direction of the rotary member; and convey means for conveying the recording medium.

14. A process cartridge removably mountable onto a main body of an image forming apparatus, said process cartridge comprising:

a cartridge frame;

an electrophotographic photosensitive drum;

a plurality of rolling members and a retainer for rotatably supporting said electrophotographic photosensitive drum on said cartridge frame, said retainer arranging said rolling members rotatably by regulating an interval between adjacent rolling members along a rotational direction of said electrophotographic photosensitive drum, said retainer having a plurality of receiving portions for receiving said rolling members, a connecting portion for connecting said receiving portions, and an attaching portion for attaching said retainer;

a developing roller for conveying toner to said electrophotographic photosensitive drum to thereby develop a latent image formed thereon;

a charging roller disposed to be in contact with said electrophotographic photosensitive drum; and a cleaning blade disposed to be in contact with said electrophotographic photosensitive drum for removing residual toner.

15. A process cartridge according to claim 14, wherein said rolling members are balls.

16. A process cartridge according to claim 14, wherein said rolling members are cylindrical rollers.

17. A process cartridge according to claim 14 or 15, further comprising a flange and a shaft portion attached to said electrophotographic photosensitive drum, said shaft portion being attached to said cartridge frame by means of said rolling members whose positions are regulated by said retainer and a holder.

18. A process cartridge according to claim 14, wherein said rolling members are made of a metal.

19. A process cartridge according to claim 18, wherein the metal is conductive.

20. A process cartridge according to claim 14, wherein the rolling members are made of an elastomer.

21. A process cartridge according to claim 20, wherein the elastomer is conductive.

22. An image forming apparatus onto which a process cartridge is removably mountable, for forming an image on a recording medium, said image forming apparatus comprising:

a mount member for removably mounting the process cartridge, the process cartridge including a cartridge frame, an electrophotographic photosensitive drum, a plurality of rolling members and a retainer for rotatably supporting the electrophotographic photosensitive drum on the cartridge frame, the retainer arranging the rolling members rotatably regulating an interval between adjacent rolling members along a rotational direction of the electrophotographic photosensitive drum, the retainer having a plurality of receiving portions for receiving the rolling members, connecting portions for connecting the receiving portions, and an attaching portion for attaching the retainer, a developing roller for conveying toner to the electrophotographic photosensitive drum to thereby develop a latent image formed thereon, a charging roller disposed to be in contact with the electrophotographic photosensitive drum, and a cleaning blade disposed to be in contact with the electrophotographic photosensitive drum for removing residual toner therefrom; and a conveying member for conveying the recording medium.

23. A process cartridge removably mountable onto a main body of an image forming apparatus, said process cartridge comprising:

a cartridge frame;

an electrophotographic photosensitive drum;

a developing roller for conveying toner to said electrophotographic photosensitive drum to develop a latent image formed thereon;

a plurality of rolling members and a retainer for rotatably supporting said electrophotographic photosensitive drum on said cartridge frame, said retainer arranging said rolling members rotatably by regulating an interval between adjacent rolling members along a rotational direction of said electrophotographic photosensitive drum, said retainer having a plurality of receiving portions for receiving said rolling members, connecting portions for connecting said receiving portions, and an attaching portion for attaching said retainer;

a charging roller disposed to be in contact with said electrophotographic photosensitive drum; and a cleaning blade disposed to be in contact with said electrophotographic photosensitive drum to remove residual toner therefrom.

24. A process cartridge according to claim 23, wherein said rolling members are balls.

25. A process cartridge according to claim 23, wherein said rolling members are cylindrical rollers.

26. A process cartridge according to claim 23, further comprising a flange and a shaft portion attached to said electrophotographic photosensitive drum, said shaft portion being attached to said cartridge frame by means of said rolling members whose positions are regulated by said retainer and a holder.

27. A process cartridge according to claim 23, wherein said rolling members are made of a metal.

28. A process cartridge according to claim 27, wherein the metal is conductive.

29. A process cartridge according to claim 23, wherein said rolling members are made of an elastomer.

30. A process cartridge according to claim 29, wherein the elastomer is conductive.

31. An image forming apparatus, onto which a process cartridge is removably mountable, for forming an image on a recording medium, said image forming apparatus comprising:

a mount member for removably mounting the process cartridge, the process cartridge including a cartridge frame, an electrophotographic photosensitive drum, a developing roller for conveying toner to the electrophotographic photosensitive drum to thereby develop a latent image formed thereon, a plurality of rolling members and a retainer for rotatably supporting the electrophotographic photosensitive drum on the cartridge frame, the retainer arranging the rolling members rotatably by regulating an interval between adjacent rolling members along a rotational direction of the electrophotographic photosensitive drum, the retainer having a plurality of receiving portions for receiving the rolling members, connecting portions for connecting the receiving portions, and an attaching portion for attaching the retainer, a charge roller disposed to be in contact with the electrophotographic photosensitive drum, and a cleaning blade disposed to be in contact with the electrophotographic photosensitive drum for removing residual toner; and a conveying member for conveying the recording material.

* * * * *

UNITED STATES PATENT AND TRADEMARK OFFICE
CERTIFICATE OF CORRECTION

PATENT NO. : 5,640,650
DATED : June 17, 1997
INVENTOR(S) : KAZUSHI WATANABE, ET AL.

It is certified that error appears in the above-identified patent and that said Letters Patent is hereby corrected as shown below:

COLUMN 4:

Line 36, "image" should read --image,--;
    Line 56, "5chaving" should read --5c having--; and
    Line 65, "(Process." should read --(Process--.

COLUMN 6:

Line 48, "forming." should read --forming--; and
    Line 59, "10d," should read --10d--.

COLUMN 8:

Line 41, "7a2" should read --7a1--; and
    Line 44, "the" should be deleted.

COLUMN 12:

Line 15, "an other" should read --another--.

UNITED STATES PATENT AND TRADEMARK OFFICE
CERTIFICATE OF CORRECTION

PATENT NO. : 5,640,650

DATED : June 17, 1997

INVENTOR(S) : KAZUSHI WATANABE, ET AL.

It is certified that error appears in the above-identified patent and that said Letters Patent is hereby corrected as shown below:

COLUMN 14:

Line 64, "apparatus" should read --apparatus,--.

Signed and Sealed this

Sixteenth Day of December, 1997

BRUCE LEHMAN

Attest:

Attesting Officer

Commissioner of Patents and Trademarks